United States Patent
Barford

(10) Patent No.: US 8,666,925 B1
(45) Date of Patent: Mar. 4, 2014

(54) METHOD FOR PARALLEL COMPUTATION OF A FINITE STATE MACHINE

(75) Inventor: Lee Barford, Reno, NV (US)

(73) Assignee: Agilent Technologies, Inc., Santa Clara, CA (US)

( * ) Notice: Subject to any disclaimer, the term of this patent is extended or adjusted under 35 U.S.C. 154(b) by 464 days.

(21) Appl. No.: 13/006,389

(22) Filed: Jan. 13, 2011

(51) Int. Cl.
  *G06F 17/00* (2006.01)
  *G06N 5/02* (2006.01)

(52) U.S. Cl.
  USPC .......................................................... 706/48

(58) Field of Classification Search
  None
  See application file for complete search history.

(56) References Cited

PUBLICATIONS

Pan et al, Parallel XML Parsing Using Meta-DFAs, 2007.*

\* cited by examiner

*Primary Examiner* — Jeffrey A Gaffin
*Assistant Examiner* — Mikayla Chubb

(57) ABSTRACT

A method for operating a plurality of processor to determine a sequence of states traversed by a finite state machine in processing an input stream that includes a plurality of characters. The method divides the input stream into a plurality of contiguous sections characterized by a beginning character and an end character. Each section is assigned to a different processor. Each processor determines an end state that the finite state machine would traverse after the end character in the section assigned to that processor has been processed. That end state is provided to a processor that did not process the section associated with that end state. Each processor determines a sequence of states that the finite state machine would traverse if the finite state machine processed the section assigned to that processor using one of said received end states.

4 Claims, 4 Drawing Sheets

US 8,666,925 B1

METHOD FOR PARALLEL COMPUTATION OF A FINITE STATE MACHINE

BACKGROUND OF THE INVENTION

A "finite state machine" is often used for finding patterns in an input string. For example, such machines are used for parsing language to detect words. A finite state machine is defined to be a machine that has a plurality of states and a rule that provides the next state of the machine given the current state and the next character in the input string being processed by the finite state machine. The set of states also includes an initial state in which the machine resides prior to the receipt of the first character in the input stream. The finite state machine generates outputs when some of the states are entered. These outputs form the outputs of the finite state machine.

Consider a finite state machine that is part of a spelling checker for a word processing program. The input stream is the document viewed as a continuous string of characters that include the alphabet and various punctuation marks. As the input string is processed one character at a time, the finite state machine moves from state to state according to the rules specified by the finite state machine. Some of the states correspond to a word being detected. When these states are entered, the finite state machine provides a corresponding output to the part of the checker that looks up the word in a dictionary.

Finite state machines are potentially useful for processing signals in instruments such as oscilloscopes to detect specific patterns in the signals. Consider the case in which the input signal that varies from 0 to 1 volt is digitized into one of three "characters". The first character corresponds to a low state and represents signals from 0 to 0.1 volts. The second character is an intermediate state that represents signals that are greater than 0.1 volts to 0.9 volts. The third character is a high state that represents signals that are greater than 0.9 volts to 1 volt. The number of states will depend on the specific characteristics that are to be recognized. The finite state machine typically implements its processing algorithm by storing a table having one row per state and one column for each possible input table. The table entries are next state of the finite state machine. That is, the entry in row, r, at column c, is the state to which the finite state machine is to assume if character "c" is received while the finite state machine is in state "r".

Parsing programs for text operate on input files that have a relatively small number of characters in the input string, typically less than 100,000 characters. A modern desktop computer can process such strings in real time as the user types or parse a stored file in a relatively short period of time. In contrast, a parsing program that operates on a digitized electrical signal must deal with much larger input streams. For example, consider a high frequency signal that is sampled every ns for 100 seconds. The resultant input sequence contains $10^{11}$ characters. If it takes only 100 ns per symbol to process the stream, the processing time is still $10^4$ seconds, i.e., approximately 3 hours. Such processing times are unacceptable in many applications.

In principle, the processing time should be capable of being reduced by employing multiple processors to process the input stream. Multi-processor computers and graphic cards having multiple processors that operate in parallel are now commonplace. High-end graphic cards include hundreds of processors that can be used for general purpose computing as well as specialized graphic computations. However, satisfactory algorithms for applying multiple processors to the problem in a manner that reduces the overall processing time to less than that encountered with a single processor are not available for many applications.

SUMMARY OF THE INVENTION

The present invention includes a method for operating a plurality of processors to determine a sequence of states traversed by a finite state machine in processing an input stream that includes a plurality of characters. The method divides the input stream into a plurality of contiguous sections characterized by a beginning character and an end character. Each section is assigned to a different processor. Each processor determines an end state that the finite state machine would traverse after the end character in the section assigned to that processor has been processed. The processors operate in parallel. That end state is provided to a processor that did not process the section associated with that end state. Each processor determines a sequence of states that the finite state machine would traverse if the finite state machine processed the section assigned to that processor using one of said received end states.

DETAILED DESCRIPTION OF PREFERRED EMBODIMENTS OF THE INVENTION

Figure 1:
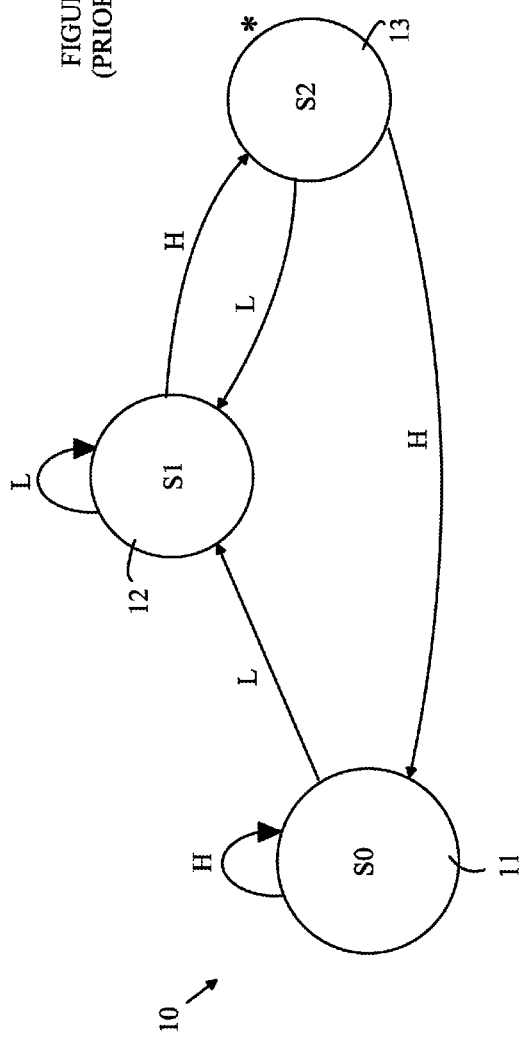
FIGS. 1A and 1B illustrate a simple finite state machine for processing a digitized signal to detect low to high transitions in the signal.

The manner in which the present invention provides its advantages can be more easily understood with reference to FIGS. 1A and 1B, which illustrate a simple finite state machine (FSM) for processing a digitized signal to detect low to high transitions in the signal. FSM 10 receives an input string comprising a string of characters having two values, L and H. The FSM 10 outputs a signal each time a transition in the input signal from L to H occurs. FSM 10 has three states, S0, S1, and S2 shown at 11-13, respectively. S0 is the initial state for the machine at the start of processing. FSM 10 remains in S0 until an L is received, at which time, FSM 10 advances to S1. Once FSM 10 enters S1, FSM 10 remains in that state until an H is received. At which time, FSM 10 proceeds to S2 and outputs a signal as indicated by the "*" next to state S2. FSM 10 leaves S2 upon receipt of the next character, either going to S1 if an L is received or S0 if a H is received.

Denote the input stream to the FSM by $I_j$ for j=1 to $N_I$. Each $I_j$ can take on a finite number of predetermined values. The number of such "symbol values" will be denoted by $N_s$. The set of possible symbol values will be referred to as the alphabet in the following discussion. In the simple example shown in FIG. 1, $N_s$=2. For each state, the FSM provides a function that specifies the next state of the FSM given the current state and next symbol in the input stream. This function will be referred to as the FSM transition function in the following discussion. As noted above, the FSM transition function can be implemented with a table having one row per state and one column per symbol in the alphabet. The table entries are the next state the FSM will assume when the FSM processes the symbol shown in each column from the state shown in each row. A separate table can be used to specify which states produce outputs when the FSM enters those states.

In a conventional FSM, a single processor proceeds through the input stream one symbol at a time and updates the state of the machine using the FSM transition function. As noted above, for large input streams, this process can require an unacceptable processing time for many applications of interest, particularly in signal processing applications in which a signal has been digitized and stored and must be processed quickly before the next signal is received. The present invention operates by dividing the processing task among a number of processors such that the processing time is substantially reduced.

Denote the number of processors that are available to process this input stream by $N_p$. In the present invention, the input stream, h, is divided into $N_p$ "sections" of substantially equal length. One processor is assigned to each section. The processors work in parallel to process their respective sections. It should be noted that each processor cannot merely process its section using the FSM transition function, since, with the exception of the first section, the processor cannot determine the state of the FSM at the beginning of its section until the processor working on the previous section has completed its work. As a result, only one processor would actually be working at any given time, and hence, a substantial improvement in processing time would not be realized.

In the present invention, each processor makes two passes through its respective section to provide the outputs that are generated by that section. During each pass, the processors work independently of each other and in parallel. In the first pass, the processors execute an algorithm that solves a related problem that can be used to determine the state of the FSM at the end of each section. This information can then be used by each processor in the second pass to determine the state of the FSM after each input symbol is processed by the FSM. Since each processor must make two passes, the time needed to process the input stream is approximately $2/N_p$ times the time that would be needed with a single processor. Hence, if $N_p$ is greater than two, the time needed to process the input stream is reduced.

The processing algorithm utilized in the first pass operates on a set of vectors that will be denoted by $T_i$. These vectors will be referred to as the state vectors in the following discussion. The set of state vectors depends only on the FSM, and hence, the work needed to create this set can be done when the FSM is defined. Each state vector in the set has $N_{state}$ components, and each component has a value between 0 and $N_{state}-1$. There are $N_{state}$ raised to the $N_{state}$ power of such vectors; however, as will be discussed in detail below, the number of such vectors that actually needed to construct the set needed in the FSM processing is in many signal processing problems of interest is substantially less than this maximum. In the case shown in FIG. 1, the number of potential vectors is 27; however, as will be discussed in more detail below, the set needed for the processing method used in the present invention requires only five of these.

In the present invention, a state vector transition map is defined. The state vector transition map maps any vector in the set to another vector in the set using the FSM transition function. Given a first vector from the set and a symbol from the alphabet, the FSM transition function operates as follows. For each component in the first vector, the FSM transition function is used to determine the state the FSM would assume upon receiving the symbol in question if the FSM was in the state specified by the component of the first vector when that symbol was received. The determined state becomes the corresponding component in the second vector. For example, consider the FSM shown in FIG. 1B and a first vector, [0, 2, 1], and the symbol "L". If the FSM were in state 0 when an L was received, the FSM would proceed to state 1. Hence, the first component of the second vector would be 1. If FSM were in state 2, and an L was received, the FSM would proceed to state 1; hence, the second component of the second vector would be 1. Finally, if the FSM were in state 1 and an L was received, the FSM would remain in state 1; hence, the second vector would have components [1,1,1].

The state vector transition map can be specified by a table having one row for each possible vector in the set and one column for each symbol in the alphabet. The table entries are the second vector generated by the state vector transition map when the first vector is the vector corresponding to the row and the symbol is the symbol corresponding to the column. If the table includes all possible vectors, the number of rows becomes prohibitively large for many applications. For example, a FSM with 100 states would require $100^{100}$ rows. It should be noted that if the table is too large to store in memory, the processing will be slowed by disk accesses, and the benefits of parallel processing will be lost. The present invention is based on the observation that only a fraction of the possible vectors are actually needed in the present invention for many FSMs of interest.

As will be discussed in detail below, the only state vectors that need be considered are those that can be generated starting from a "seed" vector by applying the state vector transition map in an iterative manner. This set of vectors is generated by initializing the set with the seed vector. For each vector in the set that has not been mapped using each possible symbol value and the state vector transition map, the vector in question is so mapped to generate $N_s$ new vectors. The information obtained is then used to fill in one row of the state vector transition map table. If any of these vectors is not already in the set, that vector is added to the set and marked as not having been mapped. Finally, the vector that had just been processed is marked as having been processed. When the set no longer contains any vector that has not been processed, the process is terminated.

Figure 2:
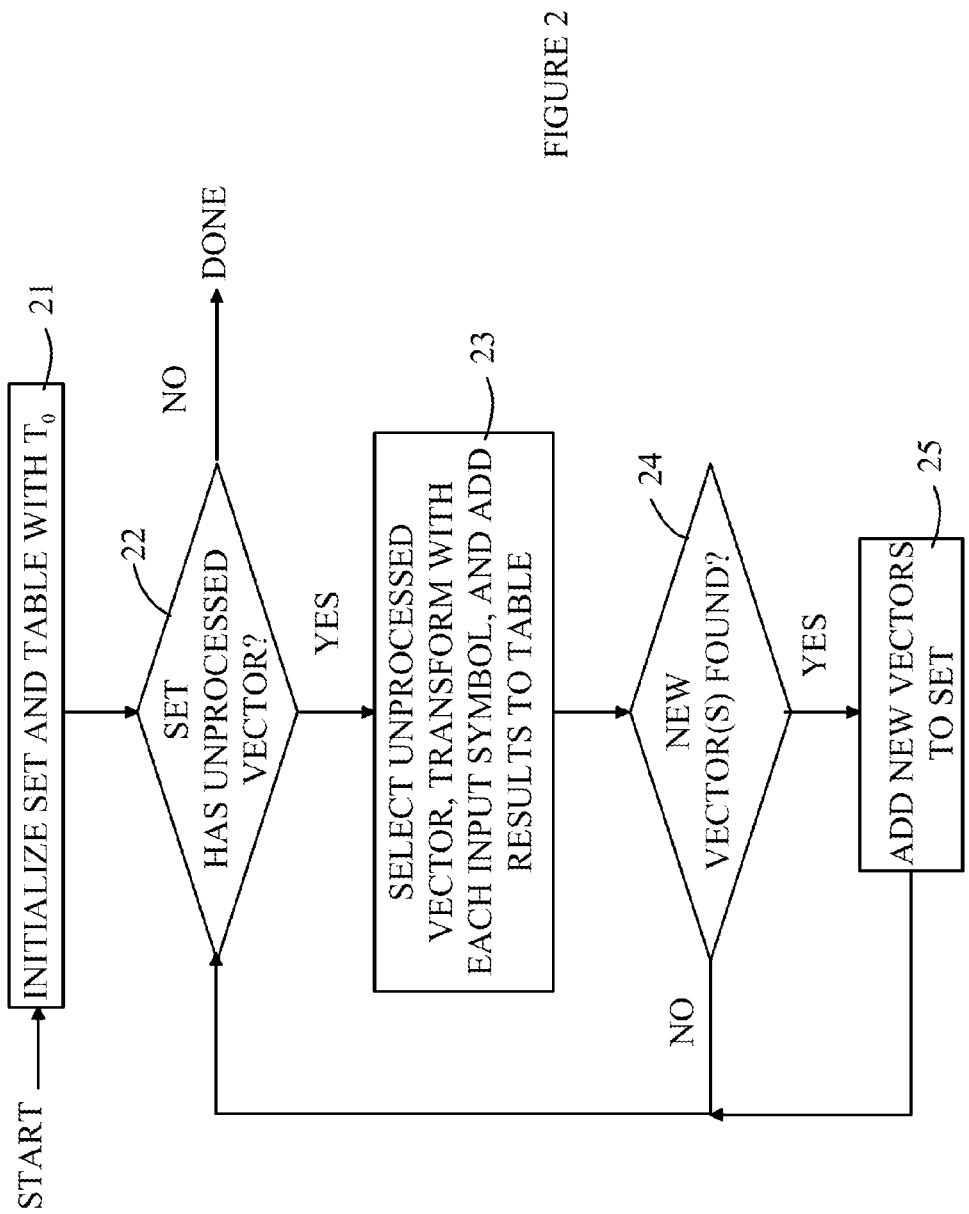
FIG. 2 is a flow chart of the method used to generate the vector transition table in the more general case.

Refer now to FIG. 2, which is a flow chart of the method used to generate the vector transition table in the more general case. The procedure starts by initializing the set of vectors and the vector transition table with Tas shown at 21. Initially, there is one unprocessed vector, $T_0$, in the set. The processing is iterative starting with step 22. The set is examined to determine if any unprocessed vectors are in the set. If none remain, the process terminates. If there is an unprocessed vector in the set, the vector is selected and transformed using the FSM for each possible input symbol as shown at 23. If there are $N_s$ symbols in the alphabet, this step generates $N_s$ vectors and provides one row of the vector transition table. The vectors that were generated are compared with the vectors that have been previously found as shown at 24. If any new vectors have been generated, the new vectors are added to the set as shown at 25. The program then returns to step 22.

Figure 3:
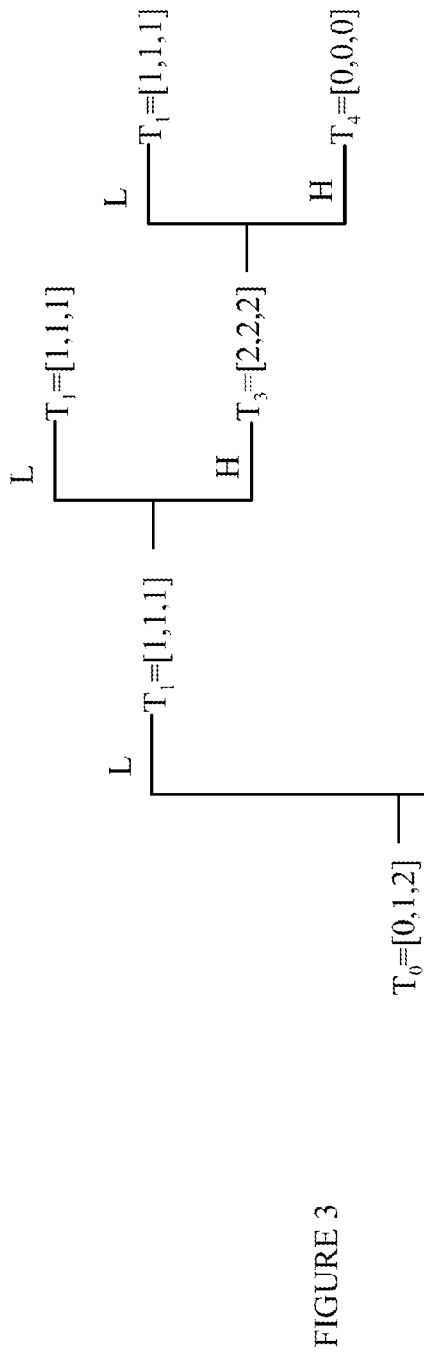
FIG. 3 illustrates the generation of the various vectors of the set that arise using this procedure for the FSM shown in FIG. 1.

Refer now to FIG. 3, which illustrates the generation of the various vectors of the set that arise using this procedure for the FSM shown in FIG. 1. The seed vector is chosen to be $T_0$=[0,1,2]. $T_0$ is mapped by the state vector transition map to two new vectors. $T_0$ and L is mapped to $T_1$=[1,1,1], and $T_0$ and H is mapped to $T_2$=[0,2,0]. The new vectors are not in the set, and hence, are added to the set. The algorithm needs to be applied again to these two new vectors to determine if any additional vectors are seen. If the algorithm is applied to $T_1$ with an input character of L, the resultant vector is $T_1=[1,1,1]$, i.e., no new vector is obtained. If the algorithm is applied to $T_1$ with an input character of H, the resultant vector is [2,2,2] which is a new vector that will be named $T_3$. If the algorithm is applied to $T_2$ and L, the resultant vector is [1,1,1] which is just $T_1$. If the algorithm is applied to $T_2$ and H, the resultant vector is $T_4=[0,0,0]$, i.e., another new vector. It can be shown that $T_3$ and $T_4$ do not give rise to any new vectors. Hence, there are only four vectors out of the total of 27 possible vectors that are actually realized starting from $T_0$. The state vector transition map for the FSM shown in FIG. 1B is summarized in FIG. 4.

Figure 4:
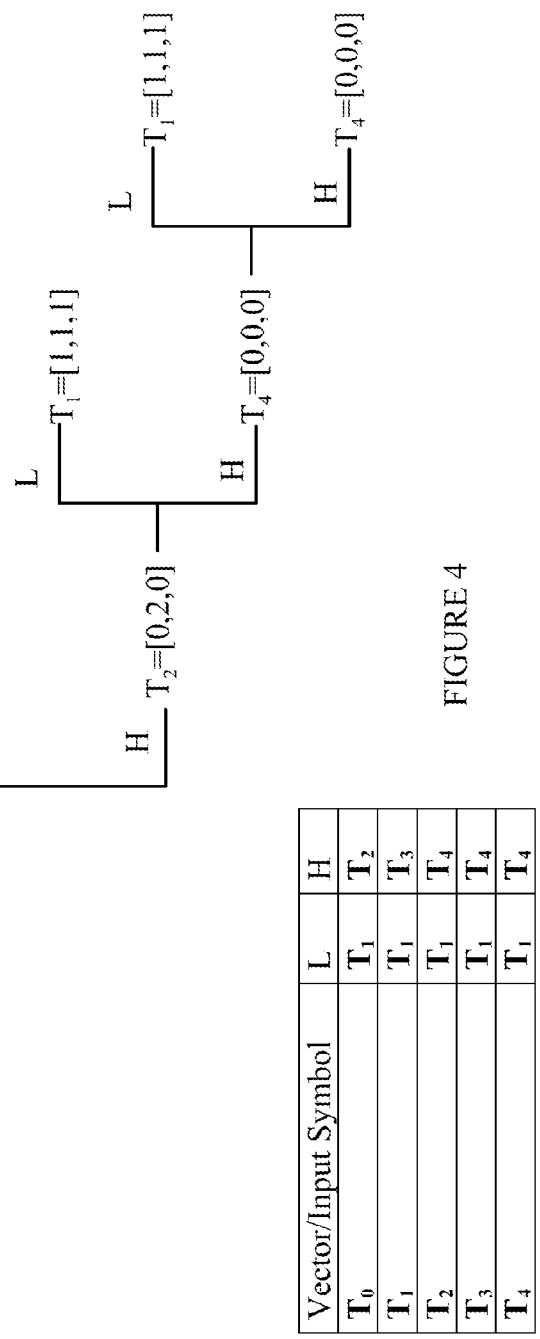
FIG. 4 is a table that summarizes the vector transitions that can take place starting from vector $T_0$.

Refer now to FIG. 4, which is a table that summarizes the vector transitions that can take place starting from vector $T_0$. This table will be referred to as the vector transition table in the following discussion. The table provides the next vector to insert when the previous vector is processed with the symbol in question. It should be noted that the table can be constructed from the FSM, and the input symbol alphabet. Given any FSM, a corresponding vector transition table can be constructed in a manner analogous to that described above.

Figure 5:
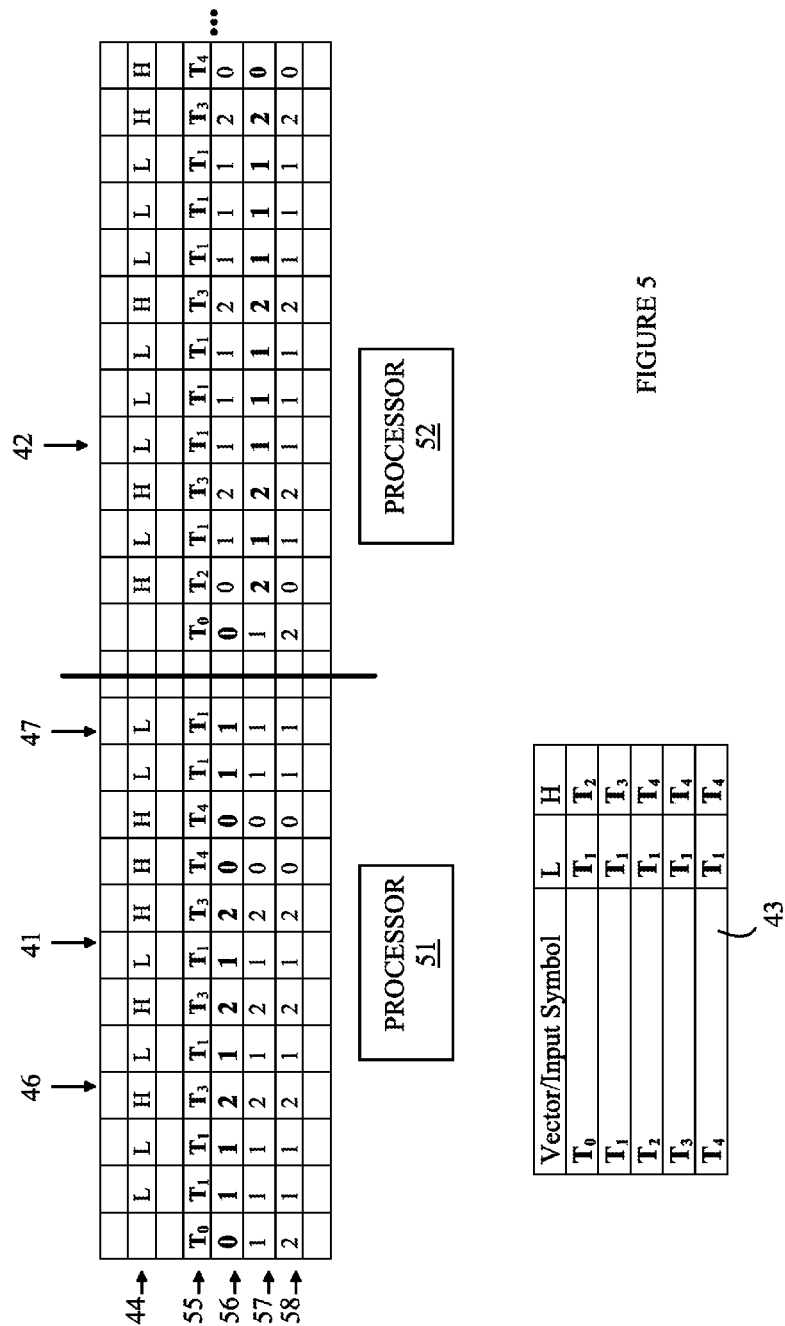
FIG. 5 illustrates a method for implementing the simple FSM shown in FIG. 1 using multiple processors.

Refer now to FIG. 5, which illustrates a method for implementing the simple FSM shown in FIG. 1 using an FSM that is implemented on a computer having multiple processors. Exemplary processors are shown at 51 and 52. To simplify the discussion, only two processors are shown; however, additional processors that process additional portions of the input stream are present. The portion of the input stream that is processed by processors 51 and 52 is shown at 44. The input stream symbols are from the two-letter alphabet discussed above. The input stream is divided into two "sections" shown at 41 and 42. Section 41 is processed by processor 51, and section 42 is processed by processor 52. The vector transition map discussed above is reproduced at 43. Each processor generates a sequence of vectors starting from $T_0$. The vectors are shown at 55. Each vector corresponds to a different one of the characters in the input stream. In general, the vector corresponding to an input character at the $k^{th}$ location in the section is generated by applying the state vector transition map to the vector corresponding to the $(k-1)^{st}$ input character for the symbol at the $k^{th}$ location. For example, the symbol at location 46 in section 41 is an H. The vector at the previous location is $T_1$. Hence, the vector at location 46 is $T_3$.

Each processor processes that processor's section independently of the other processors. Since each processor knows the seed vector at the start of the processing, each processor can work in parallel with the other processors and does not require any information from the adjacent processors during the first pass through the input stream. At the end of the first pass, the vectors will have been filled in for the entire input stream. It should be noted that the processing time needed to process a vector given an input symbol to arrive at the next vector is the same as that required to process a symbol with the FSM to obtain the new state given the old state. Both operations can be implemented by a single table lookup.

The sequence of vectors for each section can be viewed as a table having $N_s$ rows and $N_c+1$ columns, where $N_c$ is the number of symbols processed by the processor in that section. In this example, $N_s=3$. Note that the first column of each table is occupied by the "seed" vector, $T_0$. The components of each vector have been listed under the vector in FIG. 5 at rows 56-58. Consider row 56, which corresponds to the first component of $T_0$. If the first column containing the seed vector is ignored, this row contains the states of the FSM that would be traversed in this section of the input stream by FSM if the initial state of the FSM is state 0. The second row contains the states of the FSM that would be traversed if the initial state of the FSM at the beginning of that section were state 1. The third row contains the states of the FSM that would be traversed if the initial state of the FSM were state 2. It should be noted that the last column in the table for any given section provides the state of the FSM at the end of that section if the initial state of the FSM were the value in the corresponding entry in $T_0$ at the beginning of the section. For example, referring to section 41, if the initial state of the FSM at the beginning of this section were state 0, the final state of the FSM at the end of the section would be state 1 and the intermediate states traversed are given the entries on line 46.

The state of the FSM at the beginning of the first section is known from the FSM. In the present example, that state is state 0. Hence, the states that the FSM traverses in the first section are given by the values on line 56 within that section. The state of the FSM at the end of the first section is given in column 47 on line 56, namely state 1. This is also the state of the FSM at the beginning of section 42. Hence, the states that the FSM traverses during section 42 are given by row 47 within section 42. At the end of section 42, the state of the FSM is state 0. Hence, the states of the FSM at the beginning of each section can be provided by a single lookup per section as soon as the first pass is completed.

During the second pass, each processor determines the sequence of states through which the FSM passes during the traversal of the section of the input stream assigned to that processor and provides the outputs associated with any states that generate outputs. At the beginning of the second pass through the sections, the first processor communicates the final state for its section to the second processor. The second processor then uses this information to determine the state of the FSM at the end of the second section by accessing the corresponding element of the last vector in that section. This state is then passed to the next processor, and so on. Since each processor can pass on its ending state by a single lookup operation once it receives the initial state information from the previous processor, the time to propagate the state of the FSM at the end of each section is negligible. Hence, the time to execute the second pass to provide the sequence of states for the FSM is just the time to access the appropriate row of the table of vectors in each section. Again, this operation can be performed in parallel.

The above-described embodiments determine the sequence of states executed by the FSM while traversing the input sequence in each section by reading out the appropriate components of the stored state vectors. This arrangement requires that all of the vectors generated in traversing the section during the first pass be stored for use in the second pass. In some cases, the amount of storage needed can pose problems, particularly if the stored data must be moved to some form of slow memory such as a disk drive. At a minimum, the additional storage is the storage needed to store the "names" of the state vectors. Since the number of state vectors is greater than the number of letters in the alphabet, this storage is greater than that required for the input stream, since more bits must be reserved for the vector names than for the input sequence characters, and there is one vector for each character in the input stream. If the actual vectors are stored, the storage required is increased by a factor equal to the number of states in the FSM.

In one aspect of the invention, this additional storage is reduced by storing only the last vector in each section. Only the last vector in each section is needed to determine the state of the FSM at beginning of the next section. To arrive at the last vector, only one additional vector must be stored at any given time in each section, i.e. the vector previous to the vector used to compute the current vector. Once the state of the FSM at the beginning of a section is known, the states that the FSM traverses during the processing of that section can be determined by executing the FSM transition function on that section using the processor associated with that section. The time to execute the FSM directly is one table lookup per input symbol in a table that has one row per state and one column for each symbol in the alphabet.

If just the "name" of each vector is stored by the processor operating on that section, the time to readout the stored vector still requires a table lookup. The processor must lookup the component in question in a table that has one row per state of the FSM and one column for each vector in the set. In general, the number of vectors will be much greater than the number of symbols in the alphabet. Hence, the time needed to process the section using the FSM directly is equal to, or less than, the time needed to read out the components of the stored vectors.

In the above-described embodiments of the present invention, the seed vector is the vector whose $k^{th}$ component has a value equal to the k−1, for 1 to $N_s$, the number of states in the FSM. However, any vector that is obtained by a permutation of that vector could also be utilized. The only requirement for the seed vector is that its components have a one-to-one relationship with the states of the FSM.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A method for operating a plurality of processors to determine a sequence of states traversed by a finite state machine in processing an input stream comprising a plurality of characters, said method comprising:

dividing said input stream into a plurality of sections characterized by a beginning character and an end character;

assigning each section to a different processor;

defining a seed vector having one component for each state of said finite state machine;

determining a set of vectors that can be generated by said finite state machine starting from said seed vector;

causing each processor to determine an end state that said finite state machine would traverse after said end character in said section assigned to that processor has been processed for each possible initial state that could be present as input to said section, each processor implementing a transition function that maps each of said vectors to a corresponding one of said vectors in said set of vectors, said corresponding one of said vectors in said set of vectors being defined for each possible input character, wherein each of said vectors mapped by said transition function is a vector that could be reached from said seed vector;

providing that end state to a processor that did not process said section associated with that end state; and causing each processor to determine a sequence of states that said finite state machine would traverse if said finite state machine processed said section assigned to that processor.

2. The method of claim 1 wherein causing each processor to determine a sequence of states comprises executing said finite state machine on said section assigned to that processor utilizing an initial state that is said end state provided by one of said processors assigned to an adjacent section.

3. The method of claim 1 wherein said input characters in said segment are ordered starting with said beginning input character and ending with said end input character and said method further comprises; determining said vector corresponding to one of said input characters other than said beginning input character by mapping said vector corresponding to the preceding input character in said segment to another vector using said transition function and said one of said input characters.

4. The method of claim 1 wherein said transition function comprises a table having one row for each vector in said set of vectors and one column for each character value in said input stream.

* * * * *

UNITED STATES PATENT AND TRADEMARK OFFICE
CERTIFICATE OF CORRECTION

| | | |
|---|---|---|
| PATENT NO. | : 8,666,925 B1 | Page 1 of 1 |
| APPLICATION NO. | : 13/006389 | |
| DATED | : March 4, 2014 | |
| INVENTOR(S) | : Lee Barford | |

It is certified that error appears in the above-identified patent and that said Letters Patent is hereby corrected as shown below:

In the Claims

Column 8, line 32, in claim 3, delete "comprises;" and insert -- comprises --, therefor.

Signed and Sealed this
Third Day of June, 2014

Michelle K. Lee
*Deputy Director of the United States Patent and Trademark Office*